United States Patent [19]

Grube

[11] 4,137,567

[45] Jan. 30, 1979

[54] SYSTEM FOR PASSENGER AND LUGGAGE PROCESSING AT COMMERCIAL AIRPORTS

[76] Inventor: Hans J. Grube, 830 Riven Rock Rd., Santa Barbara, Calif. 93108

[21] Appl. No.: 624,390

[22] Filed: Oct. 21, 1975

[30] Foreign Application Priority Data

Oct. 24, 1974 [DE] Fed. Rep. of Germany ....... 2450567

[51] Int. Cl.$^2$ ..................... G01G 11/14; G08B 29/00; B65G 67/00
[52] U.S. Cl. ..................................... 364/567; 177/25; 198/504; 250/358 R; 364/478; 364/552
[58] Field of Search .................... 235/151.33; 177/1, 3, 177/25, 26, 34, 16, 52, 60; 198/38, 39, 348, 504, 570; 104/27-31; 364/567; 250/358 R

[56] References Cited

U.S. PATENT DOCUMENTS

| 3,260,349 | 7/1966 | Vander Meer | 198/38 |
| 3,588,480 | 6/1971 | Unger et al. | 235/151.33 |
| 3,666,073 | 5/1972 | Lings et al. | 198/504 |
| 3,678,278 | 7/1972 | Peil | 250/358 R |
| 3,704,773 | 12/1972 | Lingg et al. | 198/504 |
| 3,750,158 | 7/1973 | Anastassakis | 340/280 |
| 3,780,291 | 12/1973 | Stein et al. | 250/363 |
| 3,790,799 | 2/1974 | Stein et al. | 250/363 |
| 3,976,150 | 8/1976 | Wilson et al. | 235/151.33 |

OTHER PUBLICATIONS

Wahl, Paul; How Science will Foil the Skyjackers; Popular Science; Nov. 1970, pp. 59, 60, 123.
Aviation Week and Space Technology: (1) Pan Am to Use Portable X-Ray to Speed Anti-Hijack Screening (Sep. 18, 1972 -p. 26; (2) Anti-Hijacking Steps, Penalties Stiffen (Jul. 17, 1972-pp. 26-27); (3)"X-Ray Will Screen Passengers at La Guardia"; and "Hijack Plan Spurs Industry Rifts" (Dec. 11, 1972, pp. 22 & 23, respectively); (4) "1-Million Hijack Tightens Security Rules" (Aug. 7, 1972 -p. 30).

Primary Examiner—Charles E. Atkinson
Assistant Examiner—Errol A. Krass
Attorney, Agent, or Firm—Charles W. Helzer

[57] ABSTRACT

A system for processing passengers and their luggage at civil airports including a passenger processing counter for verifying airline tickets and confirming passenger identity, equipment for conveying large luggage to be separately stowed aboard the plane from the counter to the plane and installations for performing a security check of both the passengers and their hand or cabin luggage. The system is characterized by a movable conveyor belt extending from the passenger processing counter and along side a passenger passageway for lined-up passengers and the counter in close proximity thereto but inaccessible to the passengers from the station for passenger processing to a point of pickup and handling by secure airport personnel. A passenger security check zone is provided for allowing a security check of the individual passengers and is designed in the manner of a one-way gate for allowing only one-way travel of passengers through the passenger passageway from a point immediately following the passenger processing station through to a verification zone which immediately follows the security check zone and where a passenger becomes cleared by the system. A second movable conveyor belt is provided on the opposite side of the passenger passageway and starting immediately prior to the security check zone for the passengers. The second conveyor belt provides a security check of the hand or cabin luggage of the passengers and terminates behind the verification zone. The second conveyor belt is inaccesible to passengers while they are passing through the passenger security check zone and becomes accessible to particular and already cleared passengers so tha they may retrieve their security checked hand or cabin luggage after passing through the security check zone and upon reaching the verification zone.

7 Claims, 1 Drawing Figure

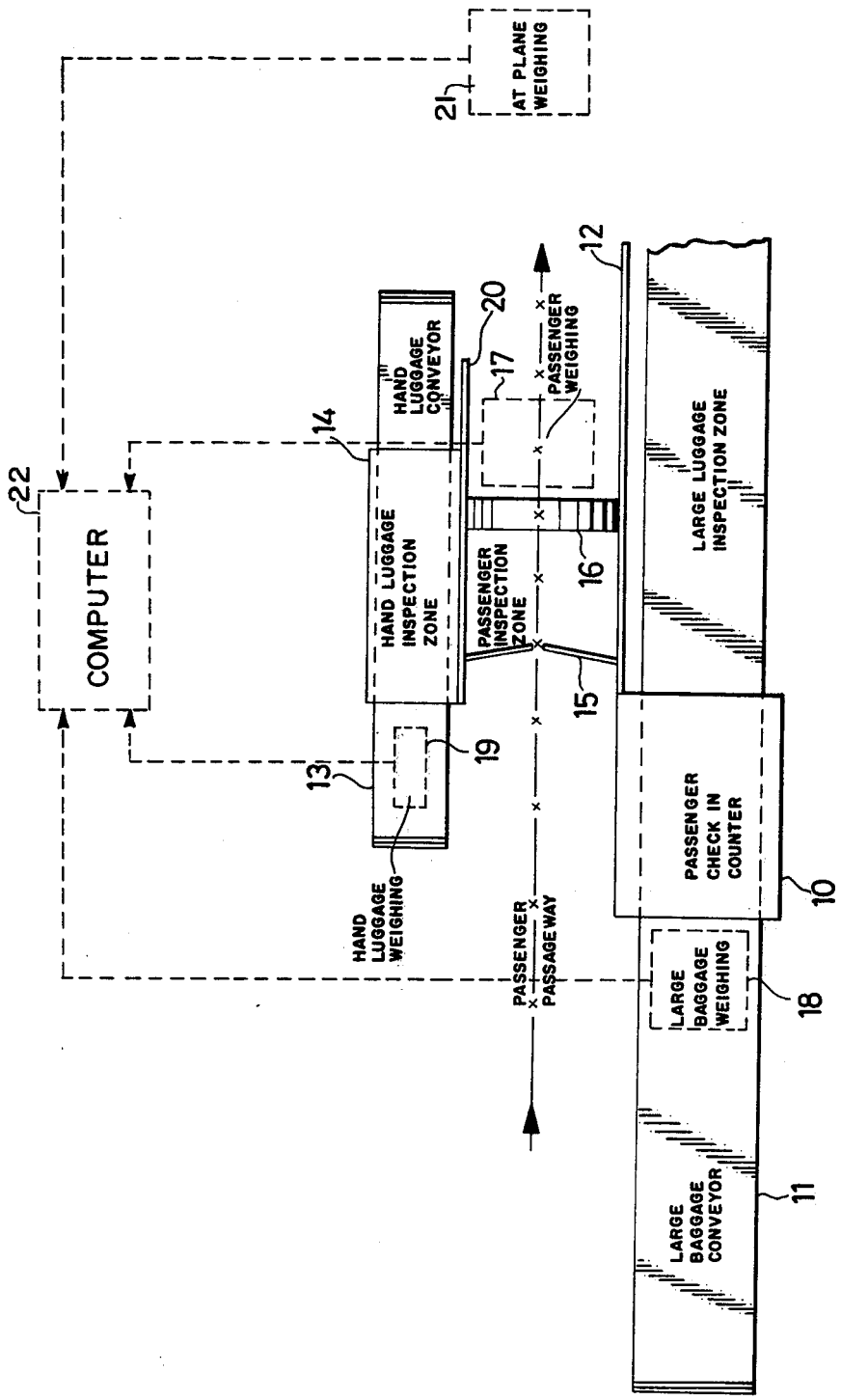

SYSTEM FOR PASSENGER AND LUGGAGE PROCESSING AT COMMERCIAL AIRPORTS

BACKGROUND OF INVENTION

1. Field of Invention

This invention relates to a new and improved system for processing passengers during check-in at commercial airports and provides a security check both of the passengers and their luggage with a minimum number of airport security personnel and in an efficient, unobtrusive and quick manner.

2. Prior Art Problem

A series of processes and security checks must be performed for various and known reasons in passenger processing at commerical airports, and it must be carried out for every passenger. First, there must be a determination that the passenger does have the proper tickets for the particular flight and his identity may be examined, if warranted, at such time. Furthermore, the large luggage carried by many passengers must be removed from the passenger's possession and stored in the cargo hold of the proper aircraft. The passenger himself must be bodily searched for prohibited objects, especially weapons. Any so-called hand or cabin luggage also must be searched for prohibited objects, again mostly for weapons. After that, care must be taken that the passenger boards the same plane in which his large luggage is stored so that the two travel together. For obvious security reasons, it is imperative that a passenger be prevented from having any luggage on a given plane without himself being on it. So long as the passenger line-up is slight there will be few difficulties encountered in performing the above verifications. However, if there is a large line-up of passengers, the security checks become time consuming, irritating and unpleasant for most passengers, and furthermore existing procedures for processing large numbers of passengers quickly in order to minimize the irritation, require an economically adverse expenditure in airport security personnel.

SUMMARY OF INVENTION

The invention is meant to alleviate the above discussed state of affairs. It relates to a system for processing passengers efficiently, quickly and in an unobtrusive manner with a minimum number of airport security personnel. The invention is characterized by a first conveyor belt for the passenger's large luggage and is located besides the passenger check-in counter in front of which the passengers line up and move past. The first conveyor belt moves past, underneath or through the check-in counter and from there on becomes inaccessible to the passengers in the direction of further large-luggage handling. The check-in counter is immediately followed by an area designed in the manner of a one-way gate that defines a zone for carrying out a security check of the passengers. A second conveyor belt is provided on the opposite side of the passenger passageway into the passenger security check zone for the hand or cabin luggage. The second conveyor belt starts ahead of the passenger security check zone and upon traversing a hand baggage security check zone ends in a verification zone where it becomes accessible to cleared passengers who have passed through the passenger security check zone and who then can pick up their security checked hand or cabin luggage.

As regards a particularly preferred embodiment of the invention, a weighing system also is provided and is installed with weighing devices located prior to the check-in counter on the large luggage conveyor belt, before the security check zone for the hand luggage conveyor belt and also in the passenger security check zone proper. The weights of the passengers, their hand or cabin luggage and their large luggage is weighed and recorded in a suitable computer or other record center by means of these devices and the information used for lading the plane. Furthermore, another weighing device is installed immediately in front of the plane to be loaded in the passenger pathway to the plane. For the purpose of obtaining a total weight, the weighing devices may be equipped with adding capabilities so that a total weight for a processed plane's passengers must result which equals the sum of the weights of the passengers and of their hand and large luggage. A preferred arrangement is to employ a central computer for correlating all of the weights obtained from weighing devices that provide an output data signal representative of the weights together with a visual representation of the weights and the summation of all of the weights. This data so obtained is extremely useful as regards security. For example, one can readily determine whether a passenger of say 50 kg weight nevertheless did succeed in not boarding the plane although he did succeed in having previously deposited large luggage stored aboard the plane without himself being aboard. What this means as a security risk is known. The comparison data for the overall recorded weights of all of the passengers with hand or cabin luggage actually on board obviously can be obtained by comparing the pertinents weights recorded during passenger processing, there being separate summations of the hand or cabin luggage weights and of the passenger weights. Thus, if the comparative weights of the hand luggage and passengers increased or decreased significantly after passing through the passenger processing station, this knowledge is of extreme value for security purposes.

The invention will be discussed in detail below by means of the single drawing which illustrates a preferred embodiment and comprises a block diagram top view of a passenger and luggage processing system according to the invention.

DETAILED DESCRIPTION OF PREFERRED EMBODIMENT

A passenger processing counter 10 of known construction, is used by one or several operators from the airline for verifying airline tickets and if required the identity of the passengers also is confirmed. The passengers move through the processing station along a passenger passageway indicated by the long arrow characterized by small crosses. A first conveyor belt 11 of known construction passes through and underneath counter 10 with the conveyor belt 11 extending for a distance appreciably ahead of the counter 10 and along side a line of waiting passengers standing in the passenger passageway. The waiting passengers place their large luggage to be carried by the plane on which their flight is scheduled on conveyor belt 11 at this point. A weighing device 18 of known construction is mounted immediately before or after the check-in counter 10 and underneath the belt and records on command the weight of a particular passenger's large luggage and passes the luggage along the conveyor belt in a known manner.

After a passenger has been issued his flight number and a boarding pass, he deposits his hand or cabin luggage onto a second conveyor belt 13 of known construction preferably located on the opposite side of the passenger's passageway from counter 10. This is the luggage which the passenger wishes to take along with him on the plane in his personal possession. The hand or cabin luggage is deposited on the front end of second conveyor belt 13 operating, as can be seen, in the same direction and parallel with the first conveyor belt 11. Conveyor belt 13 near its luggage receiving end is provided with a weighing device 19 for the purpose of weighing and recording the hand or cabin luggage weights in the same manner as that of weighing device 18 for the large luggage conveyor belt.

After depositing his hand luggage on second conveyor belt 13, the passenger without his hand or cabin luggage enters through a one-way gate or lock-like door 15 into a passenger inspection zone for his personal security check. The personal security check may for instance comprise an electromagnetic screening or checking arch 16 of known construction for electromagnetically ascertaining whether the passenger is carrying large metal objects. As may be noted, this passenger inspection zone is located between two impervious partitions 20 and 12. Partition 12 insures that the passenger upon entering the passenger inspection zone behind gate 15 no longer will have access to his large luggage. This is absolutely required from known security considerations. It should be noted that this problem is solved in the present system unobtrusively without resort to security forces, and is solved quickly, efficiently and automatically. The further partition 20 is located between the passenger inspection zone and conveyor belt 13 for denying the passenger any access to a hand luggage inspection station 14 traversed by a second conveyor belt 13. One must bear in mind that airport security personnel may verify the hand or cabin luggage in a conventional manner at station 14, or alternatively, a second electromagnetic checking arch similar to 16 may be provided at station 14 for checking the hand luggage automatically. Passengers, therefore, will have access to their hand or cabin luggage only at the end of partition 20, namely at the end of second conveyor belt 13, where they may pick it up again only after the passenger has completely traversed the passenger inspection zone and after the hand luggage has been security checked.

It is important that a passenger weighing device 17 be associated with the passenger security check zone and located so that the passenger himself shall be weighed after having released his hand or cabin luggage and prior to picking the hand luggage up again. The passenger no longer will have access to his large luggage on account of partition 12 as explained above. Airport security personnel supervising the passenger check-in system shall insure that only one person at a time will be located in the passenger security check zone between the two partitions 12 and 20. Hence, there is no possibility of a passenger picking up an article that has not been security checked, or leaving such an article behind.

In the particular embodiment of the invention herein disclosed, a further weighing device 21 is located in the passenger pathway to the plane immediately in front of the aircraft cabin door with the weighing device 21 being equipped with a weight summing capability. After all the properly processed passengers have entered the plane, the summed output from the weighing device 21 should correspond to the total weight of the passengers plus the total weight of their hand or cabin luggage. Therefore, if "everything checks out", this output value must be the same as the corresponding summed output from the weighing devices 17 and 19. As a consequence, it is made easy to determine whether a passenger was able to depart from the path between the passenger processing station and the plane proper. Accordingly, the dreaded possibility of a passenger loading luggage aboard a plane without himself participating in the flight can be detected readily in advance of flight takeoff and the missing passenger's luggage identified and removed.

While the passenger and luggage processing system shown in the drawing is operating, conveyor belts 11 and 13 can be selectively turned on or off by the airport security personnel at counter 10 and/or hand luggage inspection zone 14, depending on need. One of the most important requirements, however, is that the large luggage of a particular passenger being processed, be on scale 18 and be tagged (identified) concurrently with the issuance of the particular passenger's flight number and boarding pass, and thereafter be made inaccessible to any and all passengers from the moment the just processed passenger leaves counter 10 to enter the passenger inspection zone through gate 15. To insure strict adherence to this requirement, conveyor belts 11 and 13 will be selectively actuated by the airport security personnel as needed. These personnel may be the personnel who staff check-in counter 10 or those who verify the hand or cabin luggage at hand luggage inspection station 14.

Obviously, the system may also operate if the automatic security check of the passengers obtained by the electromagnetic arch 16, is replaced by airport security personnel. In such a case it would be necessary to see that the police or similar airport security personnel do not step on scale 17, or at least they do not affect its output values.

Finally, for those airport facilities which are large enough to have in place a central computer processing facility, such as shown in dotted outline form at 22, high speed processing of the data derived from the system as described above, is possible thereby enhancing operation of the security check system. For this purpose, it would be necessary for the weighing devices 17, 18, 19 and 21 all to possess a capability for deriving electric output signals representative of the weights of objects placed on the devices from time to time during operation of this system. Such devices have been described, for example, in U.S. Pat. No. 3,847,262 issued Nov. 12, 1975 and are available commercially from the following suppliers: Carl Schenck Maschinenfabrik GMBH, 61 Darmstdt, West Germany; DI/AN Controls, Inc., 944 Dorchester Avenue, Boston, Massachusetts, U.S.A.; Gebruder Sodhnle, 7157 Murhardt, Postfach 1260, West Germant; and BIZERBA, 746 Balingen (Wurtt) - Willem-Kraut-Strasse 41, West Germany. The output electric signals representative of the weights of the objects placed on the weighing devices then may be summed by the computer and correlated for maintaining constant supervision of a plane loading operation as discussed above. The computer may be anyone of a number of commercially available, general purpose digital computers such as those manufactured and sold by IBM, Control Data, Univac or Siemans and which possess sufficient memory storage capacity to accommodate, process, analyze and display the results of the many different weights of both the checked-in baggage, the hand carried baggage and the passengers.

Having described one embodiment of a new and improved system for processing passengers and their luggage according to the invention, it is believed obvious that other modifications and variations of the invention will be suggested to those skilled in the art in the light of the above teachings. It is therefore to be understood that changes may be made in the particular embodiment of the invention described which are within the full intended scope of the invention as defined by the appended claims.

What is claimed is:

1. A new and improved system for processing passengers and their luggage at civil airports including a passenger processing counter for verifying airline tickets and confirming passenger identity, equipment for conveying large luggage to be separately stowed aboard the plane from the counter to the plane and installations for performing a security check of both the passengers and their hand luggage, said system comprising:

(a) first moveable conveyor belt means extending alongside the passenger processing counter and alongside a passenger passageway for passengers approaching the counter for processing, said first moveable conveyor belt means being in close proximity to said counter and accessible to passengers in the passageway in advance of the counter but inaccessible to passengers from a passenger check-in station at the counter to a point of pick-up and handling by airport personnel;

(b) a passenger security check zone in which a personal security check of the individual passengers is provided, said passenger security check zone being designed in the manner of a one-way gate for allowing only one-way travel of passengers through the passenger passageway from a point immediately following the passenger check-in station at the counter through to a verification zone which immediately follows the passenger security check zone and where a passenger is considered cleared from a security standpoint;

(c) second moveable conveyor belt means accessible to passengers in the passenger passageway in the vicinity of the passenger processing counter and prior to the passenger security check zone for transporting said hand luggage of passengers through a hand luggage security check zone and terminating in the verification zone, said second moveable conveyor belt means being inaccessible to passengers while the hand luggage is passing through the hand luggage security check zone and becomes accessible to particular and security cleared passengers so that they may retrieve their security cleared hand luggage after having passed through the passenger security check zone and upon reaching the verification zone;

(d) at least one weighing device for recording the weight of the large luggage transported by the first conveyor belt means, at least one weighing device for recording the weight of the hand luggage transported by the second conveyor belt means, and at least one passenger weighing device provided in the passenger passageway of the passenger security check zone at a point where the hand luggage is inaccessible to the passenger for recording the weight of passengers;

(e) a further weighing device provided on the passenger pathway to the plane immediately adjacent to the plane entrance for recording the weight of all of the passengers plus their hand luggage as the plane is loaded; and (f) weight analyzing means for receiving and correlating the weights recorded for the large luggage, the hand luggage and the individual passengers at the passenger check-in station with their weight at the point of plane loading whereby any discrepancies between the recorded weights at the point of passenger check-in and the weights obtained from said further weighing device can be readily determined.

2. A system as set forth in claim 1 wherein the first and second moveable conveyor means each are selectively operated during the passenger check-in operation.

3. A system as set forth in claim 1 wherein manually immoveable and impervious partition means separate passengers in said passenger security check zone from the first and second conveyor belt means and their luggage carried thereby after the loading of the luggage on the conveyor belt means by the passenger.

4. A system as set forth in claim 1 wherein said weight analyzing means comprises central data processing computer means and all of said weighing devices comprise means for weighing objects placed thereon and for automatically deriving electric output signals representative of the values of the weights of the objects being weighed and supplying the signals to the central computer means for processing and correlation and for signalling the existence of any discrepancies between the value of the summed passenger and luggage check-in weights with the summed plane loading weights.

5. A system as set forth in claim 4 wherein said central data processing computer means is digitally operated and said weighing devices derive digital output electric signals for supply thereto.

6. A system as set forth in claim 5 wherein the first and second moveable conveyor means each are selectively operated during the passenger check-in operation.

7. A system as set forth in claim 6 wherein manually immoveable and impervious partition means separate passengers in said passenger security check zone from the first and second conveyor belt means and their luggage carried thereby after the loading of the luggage on the conveyor belt means by the passenger.

* * * * *